(12) United States Patent
Lee et al.

(10) Patent No.: US 12,503,629 B2
(45) Date of Patent: Dec. 23, 2025

(54) ADHESIVE COMPOSITION AND ADHESIVE FILM

(71) Applicant: LG Chem, Ltd., Seoul (KR)

(72) Inventors: Su Eun Lee, Daejeon (KR); Joo Hyun Lee, Daejeon (KR); Hu Young Yoon, Daejeon (KR); Jun Man Choi, Daejeon (KR); Jang Soon Kim, Daejeon (KR); Kwang Su Seo, Daejeon (KR)

(73) Assignee: Koza Novel Materials Korea Co., Ltd., Seoul (KR)

( * ) Notice: Subject to any disclaimer, the term of this patent is extended or adjusted under 35 U.S.C. 154(b) by 847 days.

(21) Appl. No.: 16/644,726

(22) PCT Filed: Sep. 28, 2018

(86) PCT No.: PCT/KR2018/011496
§ 371 (c)(1),
(2) Date: Mar. 5, 2020

(87) PCT Pub. No.: WO2019/066528
PCT Pub. Date: Apr. 4, 2019

(65) Prior Publication Data
US 2020/0216724 A1    Jul. 9, 2020

(30) Foreign Application Priority Data

Sep. 29, 2017  (KR) .................. 10-2017-0127777

(51) Int. Cl.
| | | |
|---|---|---|
| *C09J 133/08* | (2006.01) | |
| *C08K 5/101* | (2006.01) | |
| *C09J 4/06* | (2006.01) | |
| *C09J 133/06* | (2006.01) | |
| *C09J 133/10* | (2006.01) | |
| *C09J 133/14* | (2006.01) | |

(52) U.S. Cl.
CPC .............. *C09J 133/08* (2013.01); *C08K 5/101* (2013.01); *C09J 4/06* (2013.01); *C09J 133/064* (2013.01); *C09J 133/066* (2013.01); *C09J 133/10* (2013.01); *C09J 133/14* (2013.01); *C09J 2203/318* (2013.01); *C09J 2301/312* (2020.08); *C09J 2301/416* (2020.08); *C09J 2433/00* (2013.01)

(58) Field of Classification Search
None
See application file for complete search history.

(56) References Cited

U.S. PATENT DOCUMENTS

| | | | | |
|---|---|---|---|---|
| 5,814,685 A | * | 9/1998 | Satake | C09D 11/326 525/902 |
| 6,353,066 B1 | * | 3/2002 | Sosa | C08F 12/04 526/347 |
| 7,070,051 B2 | * | 7/2006 | Kanner | A61B 17/06133 206/460 |
| 2003/0104132 A1 | | 6/2003 | Baumgart et al. | |
| 2006/0154098 A1 | * | 7/2006 | Dollase | C09J 7/387 428/522 |
| 2011/0043737 A1 | | 2/2011 | Kim et al. | |
| 2011/0109849 A1 | | 5/2011 | Yoo et al. | |
| 2012/0108702 A1 | | 5/2012 | Miller et al. | |
| 2012/0115976 A1 | * | 5/2012 | Igarashi | C09J 4/06 522/120 |
| 2014/0302313 A1 | | 10/2014 | Suwa et al. | |
| 2015/0093569 A1 | | 4/2015 | Chi et al. | |
| 2015/0284601 A1 | | 10/2015 | Yurt et al. | |
| 2016/0121018 A1 | * | 5/2016 | Watanabe | C09J 4/06 523/118 |
| 2018/0112106 A1 | | 4/2018 | Yeon et al. | |
| 2018/0119180 A1 | | 5/2018 | Kim et al. | |
| 2019/0241690 A1 | * | 8/2019 | Beveridge | C09J 133/08 |

FOREIGN PATENT DOCUMENTS

| | | | | |
|---|---|---|---|---|
| JP | 2001011395 A | 1/2001 | | |
| JP | 2007039587 A | 2/2007 | | |
| JP | 2013040256 A | 2/2013 | | |
| JP | 2015214601 A | 12/2015 | | |
| JP | 2016505668 A | 2/2016 | | |
| KR | 20090078211 A | 7/2009 | | |
| KR | 20100003717 A | 1/2010 | | |
| KR | 2010115313 A | * 10/2010 | ............. | H01L 24/27 |
| KR | 20120104088 A | 9/2012 | | |
| KR | 20140147753 A | 12/2014 | | |
| KR | 20150026035 A | 3/2015 | | |
| KR | 20170101339 A | 9/2017 | | |
| KR | 20170103079 A | 9/2017 | | |
| KR | 20170108210 A | 9/2017 | | |
| KR | 2017115227 A | * 10/2017 | ............. | C09J 11/06 |
| WO | 2017047889 A1 | 3/2017 | | |

OTHER PUBLICATIONS

Aldrich Data Sheet (Year: 2022).*
Machine translation of KR 20170115227 A (Year: 2017).*
Machine translation of KR 20100115313 A (Year: 2010).*
International Search Report for Application No. PCT/KR2018/011496 dated Jan. 2, 2019, 2 pages.
Extended European Search Report with Written Opinion for Application No. 18861204.8 dated Jul. 8, 2020, 8 pages.
Czech, et al., "Photoreactive UV-crosslinkable solvent-free acrylic pressure-sensitive adhesives containing copolymerizable photoinitiators based on benzophenones," European Polymer Journal, May 14, 2012, pp. 1446-1454, vol. 48, No. 8, XP028427498.

* cited by examiner

*Primary Examiner* — Frank D Ducheneaux
(74) *Attorney, Agent, or Firm* — Lerner David LLP

(57) ABSTRACT

The present application relates to an adhesive composition and an adhesive film, wherein the adhesive composition includes a prepolymer and a third (meth)acrylate monomer, and the prepolymer is produced by polymerization of a mixture including a photopolymerizable functional group-containing first (meth)acrylate monomer and a second (meth)acrylate monomer.

14 Claims, No Drawings

ADHESIVE COMPOSITION AND ADHESIVE FILM

CROSS REFERENCE TO RELATED APPLICATIONS

The present application is a national stage entry under 35 USC § 371 of PCT/KR2018/011496 filed on Sep. 28, 2018, which claims priority to Korean Patent Application No. 10-2017-0127777 filed in the Korean Intellectual Property Office on Sep. 29, 2017, the entire contents of which are incorporated herein by reference.

TECHNICAL FIELD

This application claims priority to and the benefit of Korean Patent Application No. 10-2017-0127777 filed in the Korean Intellectual Property Office on Sep. 29, 2017, the entire contents of which are incorporated herein by reference.

The present invention relates to an adhesive composition and an adhesive film.

BACKGROUND ART

Recently, the lightweight smart devices such as smartphones and the tablet PCs are forming a large market.

Especially, the smart device is attempted to be changed from the existing plane structure to the curved structure in many ways from the external or aesthetical perspective.

But when making a form of the smart device in a curved structure, it is difficult to design the smart device with a curved structure because the curved structure tends to reposition to the plane structure.

To be concrete, the organic light-emitting diode (OLED) and the like used for the display of the smart device tends to go back to the plane structure when it is bent to form a curved structure, so it is difficult to design the smart device with the curved structure.

As a way to solve the problem as described above, it is possible to consider improving the adhesive strength between the display of the smart device and another device part.

In this regard, studies are continuing to improve the adhesive strength between the display of the above smart device and another device part by inserting the adhesive film between the display part of the smart device and another device part.

This adhesive film is generally produced by curing the adhesive composition which is prepared by adding a little low molecular weight acryl-type resin to the conventional acryl monomer base. But this adhesive film has a problem that it is impossible to improve stress relaxation ability, adhesive property and initial step coverage on the curved display.

Accordingly, it is necessary to research an adhesive agent which can improve stress relaxation ability, adhesive property and initial step coverage.

PRIOR ART LITERATURE

Patent Literature

[KR 10-2009-0078211 A]

DETAILED DESCRIPTION OF THE INVENTION

Technical Problem

The present invention is to provide an adhesive composition and an adhesive film.

It is to be understood, however, that the present invention is not limited to the above-mentioned problems, and other problems that are not mentioned can be clearly understood by those skilled in the art from the following description.

Technical Solution

One embodiment of the present invention provides an adhesive composition including a low molecular weight prepolymer produced by polymerization of monomer mixture including a photopolymerizable functional group-containing first (meth)acrylate monomer and a second (meth)acrylate monomer; and a third (meth)acrylate monomer, in which the weight average molecular weight of the low molecular weight prepolymer is 5,000 g/mol to 100,000 g/mol, and in which the content of the low molecular weight prepolymer is not less than the content of the third (meth)acrylate monomer.

Further, one embodiment of the present invention provides an adhesive film provided using the adhesive composition as described above.

Advantageous Effects

The adhesive composition according to one embodiment of the present invention can provide the adhesive film having excellent step coverage and stress relaxation ability.

The adhesive composition according to one embodiment of the present invention can provide the adhesive film having high adhesive strength.

The adhesive composition according to one embodiment of the present invention can provide the adhesive film which is capable of securing excellent reliability through the final curing.

The adhesive film using the adhesive composition according to one embodiment of the present invention has an advantage of being able to resolve the issue that the display part is detached from the device part when the adhesive film is applied to OLED with the curved structure.

DETAILED DESCRIPTION

Throughout the present specification, the term "on" that is used to designate a position of one element with respect to another element includes both a case that the one element is adjacent to the another element and a case that any other element exists between these two elements.

Throughout the present specification, unless otherwise explicitly specified, the term "including" any components in one element refers to the inclusion of other components rather than the exclusion of other components.

Throughout the present specification, the term "(meth)acrylate" is used to refer to both acrylate and methacrylate.

Throughout the present specification, the term "repeating unit derived from a monomer" may refer to a form in which the monomer forms a backbone, eg, a main chain or a side chain of the polymer through a polymerization reaction.

Throughout the present specification, the unit "parts by weight" may refer to the ratio of the weight between respective components.

Throughout the present specification, the term "weight average molecular weight" may be a calculated value with respect to polystyrene measured by gel permeation chromatography (GPC).

In the present specification, the glass transition temperature (Tg) may be a value determined as the midpoint of the DSC curve obtained by use of a DSC (differential scanning calorimeter, DSC-STAR3, METTLER TOLEDO) for the object via temperature increase in a temperature range of −70° C. to 100° C. with a heating rate of 5° C./minute.

Throughout the present specification, the term "aliphatic functional group" may mean a functional group containing a chain-type or branch-type hydrocarbon, and specifically means a functional group containing an alkyl group having 1 to 20 carbon atoms.

Throughout the present specification, the term "alicyclic functional group" may mean a functional group containing a cyclic-type hydrocarbon, specifically, a functional group containing a cycloalkyl group having 3 to 20 carbon atoms, and more specifically, a functional group containing a carbon ring structure in which an unsaturated bond is not present in the functional group and containing a monocyclic ring or polycyclic ring having 3 to 20 carbon atoms.

Throughout the present specification, the term "room temperature storage modulus of adhesive film" may mean storage modulus at 25° C. of the storage modulus measured at a strain of 10%, an angular velocity of 1 rad/sec and a temperature range of −20° C. to 100° C. after the following process. The prepared adhesive film specimen is laminated in a thickness of 600 μm to 800 μm, the laminated specimen is cut into a circular specimen having a diameter of 8 mm, and the circular specimen is loaded between circular parallel plates of ARES-G2 measuring instrument.

Throughout the present specification, the term "high temperature storage modulus of adhesive film" may mean storage modulus at 80° C. of the storage modulus measured at a strain of 10%, an angular velocity of 1 rad/sec and a temperature range of −20° C. to 100° C. after the following process. The prepared adhesive film specimen is laminated in a thickness of 600 μm to 800 μm, the laminated specimen is cut into a circular specimen having a diameter of 8 mm, and the circular specimen is loaded between circular parallel plates of ARES-G2 measuring instrument.

Throughout the present specification, the term "adhesive strength of a semi-cured adhesive film to a glass base" may mean adhesive strength measured at a peeling angle of 1800 and a peeling speed of 300 mm/minute of the product obtained by the following process. The prepared semi-cured adhesive film having a thickness of 150 μm is laminated on a polyethylene terephthalate (PET) film to produce a specimen, the specimen is cut to a width of 1 inch and then attached to a 1.1 T thick glass base, and the result is aged for 1 hour under the conditions of 25° C. and 50 RH %.

Throughout the present specification, the term "adhesive strength of a fully cured adhesive film to a glass base" may mean adhesive strength measured at a peeling angle of 1800 and a peeling speed of 300 mm/minute of the product obtained by the following process. The prepared semi-cured adhesive film having a thickness of 150 m is laminated on a polyethylene terephthalate (PET) film to produce a specimen, the specimen is cut to a width of 1 inch and then attached to a 1.1 T thick glass base, the specimen attached to the glass base is fully cured, and the result is aged for 1 hour under the conditions of 25° C. and 50 RH %.

The present inventors have found that the adhesive film prepared using the adhesive composition containing a low molecular weight prepolymer as an additive had a problem that the stress relaxation ability, the adhesive property, and the initial step coverage of the curved display cannot be improved. As a result of conducting various studies to solve the problem, the following invention has been completed.

The present inventors have invented the adhesive composition including the low molecular weight prepolymer as a main resin instead of an additive. The adhesive film produced using the adhesive composition according to the present invention can secure excellent stress relaxation ability, adhesive property, and initial step coverage of the curved display which can not be solved in the conventional adhesive film.

Hereinafter, the present invention will be described in more detail.

One embodiment of the present invention provides an adhesive composition including a low molecular weight prepolymer produced by polymerization of monomer mixture including a first (meth)acrylate monomer containing a photopolymerizable functional group and a second (meth)acrylate monomer; and a third (meth)acrylate monomer, in which the weight average molecular weight of the low molecular weight prepolymer is 5,000 g/mol to 100,000 g/mol, and in which the content of the low molecular weight prepolymer is not less than the content of the third (meth)acrylate monomer.

According to one embodiment of the present invention, the low molecular weight prepolymer may be produced by polymerization of the monomer mixture including the photopolymerizable functional group-containing first (meth)acrylate monomer. Specifically, the low molecular weight prepolymer is produced by polymerization of the monomer mixture including the photopolymerizable functional group-containing first (meth)acrylate monomer, thereby inducing the final curing of the adhesive film containing the semi-cured composition of the adhesive composition including the low molecular weight prepolymer.

According to one embodiment of the present invention, the first (meth)acrylate monomer may be (meth)acrylate monomer bonded with a photopolymerizable group.

According to one embodiment of the present invention, the photopolymerizable functional group may be a hydrogen recapturing type. Specifically, the photopolymerizable functional group may include an ester bond (—COO—), and the ester bond may be decomposed into an oxygen radical and a carbon radical upon curing of the adhesive composition. More specifically, the oxygen radical can dissociate the bond between hydrogen and carbon from one side of the (meth)acrylate monomer so that the hydrogen radical may be released from the (meth)acrylate monomer, thereby producing the (meth)acrylate monomer containing a carbon radical.

Further, the oxygen radical of the photopolymerizable functional group may be combined with a hydrogen radical released from the (meth)acrylate monomer, thereby forming a hydroxy group. During curing of the adhesive composition, the carbon radical of the photopolymerizable functional group may react with the carbon radical of the (meth) acrylate monomer to form a single bond.

According to one embodiment of the present invention, the photopolymerizable functional group may be at least one selected from the group consisting of a benzophenone-based functional group, a quinone-based functional group and a thioxanthone-based functional group. In other words, the photopolymerizable functional group-containing first (meth) acrylate monomer may be a (meth)acrylate monomer bonded with at least one functional group selected from the group consisting of a benzophenone-based functional group, a quinone-based functional group and a thioxanthone-based functional group.

According to one embodiment of the present invention, the benzophenone-based functional group may be a functional group derived from at least one compound selected from the group consisting of benzophenone, benzoyl benzoic acid, benzoyl benzoic acid methyl ether, 4-phenylbenzophenone, hydroxy benzophenone, 4-benzoyl-4'-methyldiphenylsulfide and 3,3'-methyl-4-methoxybenzophenone.

According to one embodiment of the present invention, the quinone-based functional group may be a functional group derived from at least one compound selected from the group consisting of quinone, anthraquinone, 2-methyl anthraquinone, 2-ethyl anthraquinone, t-butyl anthraquinone and 2,6-dichloro-9,10-anthraquinone.

According to one embodiment of the present invention, the thioxanthone-based functional group may be a functional group derived from at least one compound selected from the group consisting of thioxanthone, 2-chlorothioxanthone, 2-methylthioxanthone, 2,4-dimethylthioxanthone and isopropylthioxanthone.

According to one embodiment of the present invention, the photopolymerizable functional group-containing first (meth)acrylate monomer may be such that a leaving group bonded to the oxygen with the single bond of the (meth)acrylate monomer is substituted with the photopolymerizable functional group. Specifically, the photopolymerizable functional group-containing (meth)acrylate monomer may be benzophenone (meth)acrylate.

According to one embodiment of the present invention, each of the second (meth)acrylate monomer and the third (meth)acrylate monomer independently includes at least one monomer selected from the group consisting of an aliphatic functional group-containing (meth)acrylate monomer, an alicyclic functional group-containing (meth)acrylate monomer and a polar functional group-containing (meth)acrylate monomer.

In other words, the low molecular weight prepolymer may be produced by polymerization of the monomer mixture including the photopolymerizable functional group-containing first (meth)acrylate monomer; and at least one monomer of the aliphatic functional group-containing (meth)acrylate monomer, the alicyclic functional group-containing (meth)acrylate monomer and the polar functional group-containing (meth)acrylate monomer.

Further, the adhesive composition may include the low molecular weight prepolymer; and at least one monomer selected from the group consisting of the aliphatic functional group-containing (meth)acrylate monomer, the alicyclic functional group-containing (meth)acrylate monomer and the polar functional group-containing (meth)acrylate monomer.

In other words, the adhesive composition may include the low molecular weight prepolymer produced by polymerization of the monomer mixture including the photopolymerizable functional group-containing first (meth)acrylate monomer; and at least one monomer selected from the group consisting of the aliphatic functional group-containing (meth)acrylate monomer, the alicyclic functional group-containing (meth)acrylate monomer and the polar functional group-containing (meth)acrylate monomer, and at least one monomer selected from the group consisting of the aliphatic functional group-containing (meth)acrylate monomer, the alicyclic functional group-containing (meth)acrylate monomer and the polar functional group-containing (meth)acrylate monomer.

According to one embodiment of the present invention, the second (meth)acrylate monomer may impart the adhesive property of the low molecular weight prepolymer.

Further, according to one embodiment of the present invention, the third (meth)acrylate monomer acts as a base monomer in the adhesive composition, thereby securing the structural stability of the adhesive composition.

Specifically, the aliphatic functional group-containing (meth)acrylate monomer may be one in which the above-mentioned aliphatic functional group is bonded to the (meth)acrylate monomer. The alicyclic group-containing (meth)acrylate monomer may be one in which the above-mentioned alicyclic functional group is bonded to the (meth)acrylate monomer. The polar functional group-containing (meth)acrylate monomer may be one in which a polar functional group is bonded to the (meth)acrylate monomer.

According to one embodiment of the present invention, the low molecular weight prepolymer may be one prepared by polymerization of the monomer mixture including the photopolymerizable functional group-containing first (meth)acrylate monomer; and at least one monomer selected from the group consisting of the aliphatic functional group-containing (meth)acrylate monomer, the alicyclic functional group-containing (meth)acrylate monomer and the polar functional group-containing monomer. Specifically, the low molecular weight prepolymer may be one prepared by the solution polymerization of the monomer mixture. However, the polymerization is not limited to the solution polymerization, and the production method of the low molecular weight prepolymer may be a polymerization method commonly used in the art.

According to one embodiment of the present invention, in the monomer mixture for producing the low molecular weight prepolymer, the content of the photopolymerizable functional group-containing first (meth)acrylate monomer may be 1 part by weight to 10 parts by weight with respect to 100 parts by weight of the total weight of the second (meth)acrylate monomer.

According to an embodiment of the present invention, the content of the repeating unit derived from the photopolymerizable functional group-containing first (meth) acrylate monomer may be equal to the content of the first photopolymerizable functional group-containing first monomer mixture used in the preparation of the low molecular weight prepolymer. In addition, the total weight of the repeating units derived from the second (meth) acrylate monomer may be equal to the total weight of the second (meth) acrylate monomer in the monomer mixture used in the preparation of the low molecular weight prepolymer. That is, in the monomer mixture for polymerizing the low molecular weight prepolymer, the content of the photopolymerizable functional group-containing first (meth) acrylate monomer is 1 part by weight to 10 parts by weight based on 100 parts by weight of the total weight of the second (meth) acrylate monomer.

The content of the photopolymerizable functional group-containing first (meth)acrylate monomer is controlled in the range as described above so that the low molecular weight prepolymer may have the glass transition temperature and a weight average molecular weight as described below, and the adhesive film produced using the adhesive composition containing the low molecular weight prepolymer may be additionally cured by light irradiation or the like.

According to one embodiment of the present invention, the low molecular weight prepolymer may play a role in controlling the flexibility, the glass transition temperature, the adhesive strength, and the step coverage of the adhesive film including the low molecular weight prepolymer and may allow the adhesive film prepared using the adhesive composition including the low molecular weight prepolymer to be additionally cured by light irradiation. Further, the monomer mixture for producing the low molecular weight prepolymer may further include at least one of a molecular weight modifier, a polymerization initiator and a curing agent commonly known in the art.

According to one embodiment of the present invention, the weight average molecular weight of the low molecular weight prepolymer may be 5,000 g/mol to 100,000 g/mol, 5,000 g/mol to 50,000 g/mol, 5,000 g/mol to 30,000 g/mol, 10,000 g/mol to 100,000 g/mol, 10,000 g/mol to 50,000 g/mol, 10,000 g/mol to 30,000 g/mol, 15,000 g/mol to 100,000 g/mol, 15,000 g/mol to 50,000 g/mol or 15,000 g/mol to 30,000 g/mol.

When the weight average molecular weight of the low molecular weight prepolymer is within the range described above, the adhesive film produced using the adhesive composition including the low molecular weight prepolymer may have excellent step coverage.

According to one embodiment of the present invention, the weight average molecular weight of the low molecular weight prepolymer may be calculated one with respect to polystyrene measured by gel permeation chromatography (GPC).

According to one embodiment of the present invention, the low molecular weight prepolymer may have a glass transition temperature of −50° C. to 100° C., −50° C. to 50°, −50° C. to 0° C., −30° C. to 100° C., −30° C. to 50° C., −20° C. to 100° C., −20° C. to 50° C., or −20° C. to 0° C.

When the glass transition temperature of the low molecular weight prepolymer is within the range described above, the adhesive film produced using the adhesive composition including the low molecular weight prepolymer may secure die cutting performance.

The glass transition temperature (Tg) may be a value determined as the midpoint of the DSC curve obtained by use of a DSC (differential scanning calorimeter, DSC-STAR3, METTLER TOLEDO) for the low molecular weight prepolymer via temperature increase in a temperature range of −70° C. to 100° C. with a heating rate of 5° C./minute.

According to one embodiment of the present invention, the content of the low molecular weight prepolymer may be more than the content of the third (meth)acrylate monomer. This may mean that the low molecular weight prepolymer acts as the main resin in the adhesive composition.

According to one embodiment of the present invention, the content of the low molecular weight prepolymer may be more than the content of the third (meth)acrylate monomer. This may mean that the low molecular weight prepolymer acts as the main resin in the adhesive composition.

The content of the low molecular weight prepolymer may be more than the content of the third (meth)acrylate monomer to produce the adhesive film having a significant difference between a room temperature storage modulus and a high temperature storage modulus, thereby producing the adhesive film having excellent step coverage, stress relaxation ability and a high adhesive strength.

Specifically, the adhesive film produced using the adhesive composition may have the high temperature storage modulus sharply reduced as compared with the room temperature storage modulus. Accordingly, the adhesive film according to one embodiment of the present invention can have the excellent step coverage, the stress relaxation ability and the high adhesive strength. Further, the room temperature storage modulus and the high temperature storage modulus are described above.

According to one embodiment of the present invention, the aliphatic functional group-containing (meth)acrylate monomer may include an alkyl group-containing (meth)acrylate monomer. Specifically, the alkyl group-containing (meth)acrylate monomer may be a (meth)acrylate monomer bonded with an alkyl group. The alkyl group-containing (meth)acrylate monomer may be at least one selected from the group consisting of methacrylate, methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, and isooctyl (meth)acrylate.

According to one embodiment of the present invention, the alicyclic group-containing (meth)acrylate monomer may include a cycloalkyl group-containing (meth)acrylate monomer. Specifically, the cycloalkyl group-containing (meth)acrylate monomer may be a (meth)acrylate monomer bonded with a cycloalkyl group. The cycloalkyl group-containing (meth)acrylate monomer may be at least one selected from the group consisting of cyclohexyl acrylate (CHA), cyclohexyl methacrylate (CHMA), isobornyl acrylate (IBOA), isobornyl methacrylate (IBOMA), isobornyl methyl (meth)acrylate and 3,3,5-trimethylcyclohexylacrylate (TMCHA).

According to one embodiment of the present invention, the polar functional group-containing (meth)acrylate monomer may be at least one monomer selected from the group consisting of a hydroxyl group-containing (meth)acrylate monomer, a carboxyl group-containing (meth)acrylate monomer and a nitrogen-containing (meth)acrylate monomer.

According to one embodiment of the present invention, the hydroxy group-containing (meth)acrylate monomer may include at least one selected from the group consisting of 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate and 2-hydroxypropylene glycol (meth)acrylate.

According to one embodiment of the present invention, the carboxyl group-containing (meth)acrylate monomer may include at least one selected from the group consisting of acrylic acid, methacrylic acid, 2-carboxyethyl acrylic acid, 3-carboxypropyl acrylic acid, 2-(meth)acryloyloxy acetic acid, 3-(meth)acryloyloxy propyl acid, 4-(meth)acryloyloxy butyric acid and acrylic acid diester.

According to one embodiment of the present invention, the nitrogen-containing (meth)acrylate monomer may include at least one selected from the group consisting of 2-isocyanatoethyl (meth)acrylate, 3-isocyanatopropyl (meth)acrylate, 4-isocyanatobutyl (meth)acrylate and (meth)acrylamide.

According to one embodiment of the present invention, the content of the low molecular weight prepolymer may be 40 parts by weight to 70 parts by weight, 40 parts by weight to 60 parts by weight, 50 parts by weight to 70 parts by weight, or 50 parts by weight to 60 parts by weight with respect to 100 parts by weight of the adhesive composition.

When the content of the low molecular weight prepolymer in the adhesive composition is within the range as described above, the adhesive composition may include the low molecular weight prepolymer as a main resin, and the adhesive composition results in the adhesive film that has a significant decrease in compressive strength according to the increase in temperature, is capable of being finally cured, and has excellent step coverage.

Conventionally, the low molecular weight prepolymer has been added to the adhesive composition in a small amount as an additive. However, this case has been a problem that the storage modulus is not significantly decreased according to temperature change and that there are low adhesive strength and inferior step coverage.

On the other hand, the adhesive composition according to one embodiment of the present invention may include the low molecular weight prepolymer as a main resin, thereby producing the adhesive film which is capable of finally cured and has excellent step coverage and high adhesive strength.

According to one embodiment of the present invention, the content of the third (meth)acrylate monomer may be 30 parts by weight to 60 parts by weight, 30 parts by weight to 50 parts by weight, 40 parts by weight to 60 parts by weight or 40 parts by weight to 50 parts by weight with respect to 100 parts by weight of the adhesive composition. However, the present invention is not limited thereto and can be appropriately adjusted according to the content of the low molecular weight prepolymer.

The content of the third (meth)acrylate monomer is adjusted in the range as described above so that the adhesive film produced using the adhesive composition has a relatively high glass transition temperature and accordingly can have excellent die cutting performance.

According to one embodiment of the present invention, the adhesive composition may further include a polymerization initiator, specifically a photopolymerization initiator and/or a thermal polymerization initiator. Further, the polymerization initiator may be freely selected among polymerization initiators commonly known in the art.

According to one embodiment of the present invention, the adhesive composition may further include a curing agent, specifically a photo-curing agent and/or a thermal curing agent. Further, the curing agent may be freely selected from curing agents commonly known in the art.

According to one embodiment of the present invention, the adhesive composition may further include an additive including at least one of a tackifier, a softener, a plasticizer and an antioxidant. However, the types of the tackifier, softener, plasticizer and antioxidant are not particularly limited and may be selected from those known in the art.

According to one embodiment of the present invention, the adhesive composition may be one which does not contain any additional solvent. In other words, the adhesive composition may be a solvent-free type adhesive composition.

One embodiment of the present invention provides an adhesive film produced using the adhesive composition. Specifically, the adhesive film may be one prepared by curing the adhesive composition. More specifically, the adhesive film may be one produced by photo-curing the adhesive composition.

According to one embodiment of the present invention, the adhesive film may be a semi-cured adhesive film prepared by primary of curing the adhesive composition. Further, the adhesive film may be a fully cured adhesive film produced by additionally curing after the primary curing.

According to one embodiment of the present invention, the fully cured adhesive film may be one produced by additionally curing the semi-cured adhesive film. In other words, the fully cured adhesive film may be one prepared by primary curing of the adhesive composition and additionally curing the primary-cured adhesive composition.

According to one embodiment of the present invention, the semi-cured adhesive film may be one prepared by irradiating the adhesive composition with black light for 3 minutes or more.

According to one embodiment of the present invention, the fully cured adhesive film may be one produced by irradiating the semi-cured adhesive film with light having a light quantity of 3,000 mJ/cm² or more. Specifically, the light source of the light which is irradiated to the semi-cured adhesive film may be a metal halide, a high-pressure mercury lamp or a UV LED, but a light source capable of irradiating ultraviolet light may be freely selected from those known in the art.

More specifically, the fully cured adhesive film is one produced by irradiating the adhesive composition with a black light for 3 minutes or more to produce a semi-cured adhesive film and then irradiating the semi-cured adhesive film with light having a light quantity of 3,000 mJ/cm² or more.

According to one embodiment of the present invention, the gel content of the semi-cured adhesive film may be more than 0% and 70% or less. Further, the gel content of the fully cured adhesive film may be more than 70% and 100% or less. In other words, the semi-cured adhesive film may mean an adhesive film having a gel content of more than 0% and 70% or less, and the fully cured adhesive film may mean an adhesive film having a gel content of more than 70% and 100% or less.

According to one embodiment of the present invention, the gel content of the adhesive film may be measured in the following Equation 1:

$$\text{Gel content (\%)}=(C-B)/A \quad \text{[Equation 1]}$$

In Equation 1,

A represents the weight of the adhesive film specimen cut into a size of 5 cm×5 cm in a polyethylene bottle, B represents the weight of the iron mesh net cut into a size of 14 cm×14 cm, C represents the weight of one obtained by filtering the adhesive film specimen with the iron mesh net and then drying the iron mesh net having remnants of the adhesive film specimen for 2 hours at a temperature of 110° C. and relative humidity of 50 RH %.

According to one embodiment of the present invention, when the semi-cured adhesive film is laminated on a member with a step, the semi-cured adhesive film may be sufficiently embedded in the concavo-convex (F1) portion of the member with the step, maintaining a high adhesive strength of the adhesive film to the member.

When a general semi-cured adhesive film is additionally cured, there is a problem that the adhesive film cannot be sufficiently embedded in the member with the step, and the adhesive strength with respect to the member is lowered.

The adhesive film according to one embodiment of the present invention has an advantage that the semi-cured adhesive film laminated on the member is finally cured to prepare the fully cured adhesive film, but the fully cured adhesive film may be sufficiently embedded in the step provided on the member, and the fully cured adhesive film may be sufficiently fixed to the member.

According to one embodiment of the present invention, the semi-cured adhesive film may include a semi-cured product of the adhesive composition. Further, the fully cured adhesive film may include a fully cured product of the adhesive composition.

According to one embodiment of the present invention, the semi-cured product of the adhesive composition may mean that the gel content of the adhesive film produced using the adhesive composition is more than 0% and 70% or less.

Further, the fully cured product of the adhesive composition may mean that the gel content of the adhesive film produced using the adhesive composition is more than 70% and 100% or less.

According to one embodiment of the present invention, the difference between the room temperature storage modulus and the high temperature storage modulus of the semi-cured adhesive film may be 0.03 MPa or more.

Specifically, the difference between the room temperature storage modulus and the high temperature storage modulus of the semi-cured adhesive film may mean the absolute value of the difference between the room temperature storage modulus and the high temperature storage modulus.

Further, according to one embodiment of the present invention, the room temperature storage modulus of the semi-cured adhesive film may be 0.05 MPa or more, specifically 0.05 MPa or more at 25° C. The room temperature storage modulus may be measured according to the method as described above.

Specifically, the room temperature storage modulus of the semi-cured adhesive film may be determined as a value of the storage modulus at 25° C. of the storage modulus measured at a strain of 10%, an angular velocity of 1 rad/sec and a temperature range of −20° C. to 100° C. after the following process. The adhesive film specimen is laminated in a thickness of 600 μm to 800 μm, the laminated specimen is cut into a circular specimen having a diameter of 8 mm, and the circular specimen is loaded between circular parallel plates of ARES-G2 measuring instrument.

According to one embodiment of the present invention, the high temperature storage modulus of the semi-cured adhesive film may be 0.02 MPa or less, specifically 0.02 MPa or less at 80° C. The high temperature storage modulus may be measured according to the method as described above.

Specifically, the high temperature storage modulus of the semi-cured adhesive film may be determined as a value of the storage modulus at 80° C. of the storage modulus measured at a strain of 10%, an angular velocity of 1 rad/sec and a temperature range of −20° C. to 100° C. after the following process. The adhesive film specimen is laminated in a thickness of 600 μm to 800 μm, the laminated specimen is cut into a circular specimen having a diameter of 8 mm, and the circular specimen is loaded between circular parallel plates of ARES-G2 measuring instrument.

According to one embodiment of the present invention, it is confirmed that the high temperature storage modulus of the semi-cured adhesive film is reduced compared with the room temperature storage modulus thereof, and the storage modulus thereof at high temperature is significantly reduced compared with one at the room temperature. Accordingly, the semi-cured adhesive film can have excellent step coverage, excellent stress relaxation ability, and high adhesive strength.

According to one embodiment of the present invention, the adhesive strength of the semi-cured adhesive film to the glass base may be 3.0 kgf/in or more. Specifically, the adhesive strength of the semi-cured adhesive film to the glass base may be 3.0 kgf/in or more at 25° C. and 50 RH %.

Further, the adhesive strength of the semi-cured adhesive film to the glass base may be measured by the method as described above. Specifically, the adhesive strength of the semi-cured adhesive film to the glass base may be determined as a value of the adhesive strength measured at a peeling angle of 1800 and a peeling speed of 300 mm/minute of the product obtained by the following process. The semi-cured adhesive film is laminated on a polyethylene terephthalate (PET) film to produce a specimen, the specimen is cut to a width of 1 inch and then attached to a 1.1 T thick glass base, and the result is aged for 1 hour under the conditions of 25° C. and 50 RH %.

According to one embodiment of the present invention, the difference between the room temperature storage modulus and the high temperature storage modulus of the fully cured adhesive film may be 0.05 MPa or more.

Specifically, the difference between the room temperature storage modulus and the high temperature storage modulus of the fully cured adhesive film may mean the absolute value of the difference between the room temperature storage modulus and the high temperature storage modulus.

According to one embodiment of the present invention, the room temperature storage modulus of the fully cured adhesive film may be 0.08 MPa or more, specifically 0.08 MPa or more at 25° C.

Further, the room temperature storage modulus of the fully cured adhesive film may be measured according to the method as described above. Specifically, the room temperature storage modulus of the fully cured adhesive film may be determined as a value of the storage modulus at 25° C. of the storage modulus measured at a strain of 10%, an angular velocity of 1 rad/sec and a temperature range of −20° C. to 100° C. after the following process. The fully cured adhesive film specimen is laminated in a thickness of 600 μm to 800 μm, the laminated specimen is cut into a circular specimen having a diameter of 8 mm, and the circular specimen is loaded between circular parallel plates of ARES-G2 measuring instrument.

According to one embodiment of the present invention, the high temperature storage modulus of the fully cured adhesive film may be 0.03 MPa or less, specifically 0.03 MPa or less at 80° C.

Further, the high temperature storage modulus of the fully cured adhesive film may be measured according to the method as described above. Specifically, the high temperature storage modulus of the fully cured adhesive film may be determined as a value of the storage modulus at 80° C. of the storage modulus measured at a strain of 10%, an angular velocity of 1 rad/sec and a temperature range of −20° C. to 100° C. after the following process. The adhesive film specimen is laminated in a thickness of 600 μm to 800 μm, the laminated specimen is cut into a circular specimen having a diameter of 8 mm, and the circular specimen is loaded between circular parallel plates of ARES-G2 measuring instrument.

In other words, the above-mentioned contents can confirm that the semi-cured adhesive film may be additionally cured.

Further, the room temperature storage modulus and the high temperature storage modulus of the fully cured adhesive film confirms that although the semi-cured adhesive film is finally cured to be the fully cured adhesive film, it has a low value of high temperature storage modulus compared to the room temperature storage modulus like the semi-cured adhesive film before the final curing.

Accordingly, it is confirmed that although the semi-cured adhesive film is finally cured, it may maintain excellent step coverage, excellent stress relaxation ability, and high adhesive strength.

According to one embodiment of the present invention, the adhesive strength of the fully cured adhesive film to the glass base may be 3.0 kgf/in or more. Specifically, the adhesive strength of the fully cured adhesive film to the glass base may be 3.0 kgf/in or more at 25° C. and 50 RH %.

Further, the adhesive strength of the fully cured adhesive film to the glass base may be measured by the method as described above.

Specifically, the adhesive strength of the fully cured adhesive film to the glass base may be determined as a value of the adhesive strength measured at a peeling angle of 1800 and a peeling speed of 300 mm/minute of the product obtained by the following process. The semi-cured adhesive film is laminated on a polyethylene terephthalate (PET) film to produce a specimen, the specimen is cut to a width of 1 inch and then attached to a 1.1 T thick glass base, the specimen attached to the glass base if fully cured, and the result is aged for 1 hour under the conditions of 25° C. and 50 RH %.

According to one embodiment of the present invention, it can be seen that there is no significant difference between the adhesive strength of the semi-cured adhesive film to the glass base and the adhesive strength of the fully cured adhesive film to the glass base.

Accordingly, the semi-cured adhesive film according to one embodiment of the present invention is capable of subjecting to additional curing, and the fully cured adhesive film produced through the additional curing can maintain an excellent adhesive strength equivalent to that of the semi-cured adhesive film.

One embodiment of the present invention provides an adhesive film including a cured product of the adhesive composition.

According to one embodiment of the present invention, the adhesive film may be a semi-cured adhesive film including a semi-cured product of the adhesive composition. Further, the adhesive film may be a fully cured adhesive film including a fully cured product of the adhesive composition.

According to one embodiment of the present invention, each of the semi-cured adhesive film and the fully cured adhesive film is as described above.

Hereinafter, the present invention will be described in detail with reference to Examples. However, Examples according to the present invention can be modified into various other forms, and the scope of the present invention is not construed as being limited to the following Examples. Examples of the present specification are provided to more fully describe the present invention for those skilled in the art.

Production Example

Preparation of Low Molecular Weight Prepolymer

The solution polymerization was performed using 50 parts by weight of 2-ethylhexyl acrylate (EHA), 30 parts by weight of isobornyl acrylate (IBOA), 20 parts by weight of hydroxyethyl acrylate (HEA) and 2 parts by weight of benzophenone methacrylate (BPMA) to prepare the low molecular weight prepolymer.

The weight average molecular weight of the low molecular weight prepolymer was 5,000 g/mol to 40,000 g/mol which was calculated one with respect to polystyrene measured by gel permeation chromatography (GPC).

Further, the glass transition temperature of the low molecular weight prepolymer was −30° C. to 0° C., which was determined as the midpoint of the DSC curve obtained by subjecting the low molecular weight prepolymer to the temperature increase in a temperature range of −70° C. to 100° C. with a heating rate of 5° C./min in a differential scanning calorimeter (DSC, DSC-STAR3, METTLER TOLEDO).

EXAMPLE 1

An adhesive composition including 60 parts by weight of a low molecular weight prepolymer and 40 parts by weight of a third (meth)acrylate monomer with respect to 100 parts by weight of the adhesive composition was produced.

Further, a photo-initiator (Irgacure 651 (2,2-Dimethoxy-1,2-diphenylethan-1-one)), a crosslinking agent and a coupling agent were added to the adhesive composition to obtain a gel content as described below.

The third (meth)acrylate monomer was a mixture of 50% by weight of 2-ethylhexyl acrylate (EHA), 40% by weight of isobornyl acrylate (IBOA) and 10% by weight of hydroxyethyl acrylate (HEA).

Then, a black light was irradiated to the adhesive composition for 3 minutes or more to prepare a semi-cured adhesive film having a thickness of 150 μm.

Further, the gel content of the semi-cured adhesive film measured by the method according to the Equation 1 was 52%.

Example 2

A semi-cured adhesive film was prepared in the same manner as in Example 1, except that the composition included 50 parts by weight of a low molecular weight prepolymer and 50 parts by weight of a third (meth)acrylate monomer and had a gel content of 40%.

Comparative Example 1

A semi-cured adhesive film was prepared in the same manner as in Example 1, except that the composition included 10 parts by weight of a low molecular weight prepolymer and 90 parts by weight of a third (meth)acrylate monomer and had a gel content of 64%.

Comparative Example 2

A semi-cured adhesive film was prepared in the same manner as in Example 1, except that the composition included no third (meth)acrylate monomer and had a gel content of less than 10%.

The information on Examples 1 and 2 and Comparative Examples 1 and 2 are summarized in the following Table 1.

TABLE 1

| Types | Content of low molecular weight prepolymer (parts by weight, with respect of 100 parts by weight of adhesive composition) | Content of third (meth)acrylate monomer (parts by weight, with respect of 100 parts by weight of adhesive composition) |
| --- | --- | --- |
| Example 1 | 40 | 60 |
| Example 2 | 50 | 50 |
| Comparative Example 1 | 10 | 90 |
| Comparative Example 2 | 100 | — |

Experimental Example

1. Measurement of Storage Modulus (1) Measurement of Storage Modulus Before Additional Curing The respective semi-cured adhesive films according to Examples 1 and 2 and Comparative Examples 1 and 2 were laminated to prepare specimens having a thickness of 600 µm to 800 µm.

The specimens were cut in a circular shape with a diameter of about 8 mm and loaded between circular parallel plates of an ARES-G2 measuring instrument. The storage modulus of the specimens were then measured according to temperature ranges at a strain of 10%, a temperature of 0° C. to 100° C. and an angular velocity of 1 rad/sec.

The storage modulus of the specimens appearing at the respective temperatures of 25° C. and 80° C., respectively, are shown in Table 2 below.

(2) Measurement of Storage Modulus after Final Curing

The adhesive films according to Examples 1 and 2 and Comparative Examples 1 and 2 were irradiated with metal halide light having a light amount of 3,000 mJ/cm² to produce fully cured adhesive films. Then, the storage modulus of the specimens at 25° C. and 80° C. were measured in the same manner as in the measurement of the storage modulus before additional curing, except that the respective fully cured adhesive films were laminated to prepare specimens having a thickness of 600 µm to 800 µm. The storage modulus of the specimens are shown in the following Table 2.

2. Measurement of Adhesive Strength (1) Measurement of Adhesive Strength Before Additional Curing The respective semi-cured adhesive films according to Examples 1 and 2 and Comparative Examples 1 and 2 were laminated on a polyethylene terephthalate (PET) film to prepare specimens.

The specimens were cut to a width of 1 inch and attached to a glass base (soda lime glass) having a thickness of 1.1 T. After aging at 25° C. and 50 RH % for 1 hour, the adhesive strength of specimens was measured at a peeling angle of 180° and a peeling rate of 300 mm/min. The results are shown in the following Table 3.

(2) Measurement of Adhesive Strength after Additional Curing

The adhesive strength of the specimens was measured in the same manner as in the measurement of the adhesive strength before additional curing except that the specimens were attached to glass bases and were then irradiated with metal halide light having a light quantity of 3,000 mJ/cm² before aging at 25° C. and 50 RH % for 1 hour to produce fully cured adhesive films. The results are shown in the following Table 3.

3. Test of Stress Relaxation Ability (1) Test of Stress Relaxation Ability Before Additional Curing The respective semi-cured adhesive films according to Examples 1 and 2 and Comparative Examples 1 and 2 were laminated to prepare specimens having a thickness of 600 µm to 800 µm.

The adhesive specimens were cut in a circular shape with a diameter of about 8 mm and loaded between circular parallel plates of an ARES-G2 measuring instrument.

2 N of force was applied to the specimens in the axial direction of the circular parallel plate for 1 minute. After stopping the application of force, the stress of the specimens was measured as a percentage while 50% of strain was maintained for 5 minutes at a temperature of 25° C. The results are shown in the following Table 4.

(2) Test of Stress Relaxation Ability after Additional Curing

The stress of the specimens was measured in the same manner as in the test of stress relaxation ability before additional curing except that the semi-cured adhesive films according to Examples 1 and 2 and Comparative Examples 1 and 2 were irradiated with metal halide light having a light quantity of 3,000 mJ/cm² to produce fully cured adhesive films, and the fully cured adhesive films were laminated to prepare specimens having a thickness of 600 µm to 800 µm. The results are shown in the following Table 4.

TABLE 2

| Types | Storage modulus at 25° C. (MPa, before additional curing) | Storage modulus at 80° C. (MPa, before additional curing) | Storage modulus at 25° C. (MPa, after additional curing) | Storage modulus at 80° C. (MPa, after additional curing) |
|---|---|---|---|---|
| Example 1 | 0.08 | 0.012 | 0.11 | 0.03 |
| Example 2 | 0.07 | 0.009 | 0.09 | 0.023 |
| Comparative Example 1 | 0.1 | 0.025 | 0.14 | 0.038 |
| Comparative Example 2 | 0.03 | 0.005 | 0.05 | 0.007 |

TABLE 3

| Types | Adhesive strength (kgf/in, before additional curing) | Adhesive strength (kgf/in, after additional curing) |
|---|---|---|
| Example 1 | 3.8 | 3.3 |
| Example 2 | 4.0 | 3.5 |
| Comparative Example 1 | 2.7 | 2.2 |
| Comparative Example 2 | 5.0 | 4.5 |

TABLE 4

| Types | Stress of specimen (%, before additional curing) | Stress of specimen (%, after additional curing) |
|---|---|---|
| Example 1 | 13 | 18 |
| Example 2 | 12 | 16 |
| Comparative Example 1 | 22 | 28 |
| Comparative Example 2 | 8 | 10 |

According to Table 2, it was confirmed that the semi-cured adhesive films according to Examples 1 and 2 had a significantly decreased storage modulus at 80° C. compared to the storage modulus at 25° C.

It has been known that when the storage modulus decreases as the temperature increases, the step coverage is ensured. Thus, it can be confirmed that the semi-cured adhesive films according to Examples 1 and 2 can achieve a high step coverage.

Further, it was confirmed that after additional curing the semi-cured adhesive films according to Examples 1 and 2, they had the significantly decreased storage modulus at 80° C. compared to the storage modulus at 25° C.

Accordingly, it can be confirmed that the semi-cured adhesive film according to one embodiment of the present invention can be finally cured, and that although the semi-cured adhesive film is additionally cured to prepare the fully cured adhesive film, the fully cured adhesive film can achieve a high step coverage.

According to Table 3, the semi-cured adhesive films according to Examples 1 and 2 did not have a significant difference in adhesive strength between before and after additional curing. Thus, it was confirmed that although the semi-cured adhesive films according to Examples 1 and 2 were additionally cured to prepare the fully cured adhesive films, the fully cured adhesive films can maintain a high adhesive strength equivalent to that of the semi-cured adhesive films.

Further, according to Table 4, it was confirmed that although the semi-cured adhesive films according to Examples 1 and 2 were finally cured, the stress thereof by the applied force in the initial axial direction was lower than that of Comparative Example 1 in which the low molecular weight prepolymer was included in an amount that is less than the range according to one embodiment of the present invention.

Generally, it is known that the lower the stress on the initially applied force is, the higher the relaxation ability against the external stress is. Therefore, it was confirmed that Examples 1 and 2 had an excellent relaxation ability for external stress compared to Comparative Example 1.

In sum, the semi-cured adhesive film according to one embodiment of the present invention, which is supported according to Examples 1 and 2, has high step coverage and adhesive strength, and even when the semi-cured adhesive film is finally cured, it can maintain the high step coverage and adhesive strength of the semi-cured adhesive film.

Meanwhile, it was confirmed that Comparative Example 1 in which the content of the low molecular weight prepolymer is out of the range according to one embodiment of the present invention had a low decrease of the storage modulus at 80° C. than the storage modulus at 25° C. compared to those of Examples 1 and 2. Accordingly, it was confirmed that the adhesive film according to Comparative Example 1 had low step coverage compared to the semi-cured adhesive films according to Examples 1 and 2.

Further, it was confirmed that the adhesive film according to Comparative Example 2 including only a low-molecular-weight prepolymer had an excellent decrease of storage modulus according to temperature, an adhesive strength, and a relaxation ability for external stress compared to the semi-cured adhesive films according to Examples 1 and 2.

However, Comparative Example 2 has low storage modulus at room temperature compared to Examples 1 and 2. Thus, it was confirmed that it lowered die cutting performance resulting in a problem in which it was not applicable to an actual process.

In sum, in order to provide adhesive films with excellent step coverage and stress relaxation ability as well as high adhesive strength, the content of the low molecular weight prepolymer as in Examples 1 and 2 should be in the range according to one embedment of the present invention. In other words, the low molecular weight prepolymer should be included as a main resin.

The invention claimed is:

1. An adhesive composition comprising:
   a prepolymer and a third (meth)acrylate monomer,
   wherein the prepolymer is produced by polymerization of a monomer mixture including a first (meth)acrylate monomer containing a photopolymerizable functional group; and a second (meth)acrylate monomer, wherein the second (meth)acrylate monomer comprises an aliphatic functional group-containing (meth)acrylate monomer, an alicyclic functional group-containing (meth)acrylate monomer, and a polar functional group-containing (meth)acrylate monomer,
   wherein a weight average molecular weight of the prepolymer is 5,000 g/mol to 100,000 g/mol,
   wherein a content of the prepolymer is not less than a content of the third (meth)acrylate monomer, and
   wherein a content of the third (meth)acrylate monomer is 40 parts by weight to 50 parts by weight with respect to 100 parts by weight of the adhesive composition.

2. The adhesive composition of claim 1, wherein a glass transition temperature of the prepolymer is −50° C. to 100° C.

3. The adhesive composition of claim 1, wherein the photopolymerizable functional group is at least one selected from the group consisting of a benzophenone-based functional group, a quinone-based functional group and a thioxanthone-based functional group.

4. The adhesive composition of claim 1, wherein a content of the prepolymer is 50 parts by weight to 60 parts by weight with respect to 100 parts by weight of the adhesive composition.

5. The adhesive composition of claim 1, wherein a content of the third (meth)acrylate monomer is 30-50 parts by weight with respect to 100 parts by weight of the adhesive composition.

6. The adhesive composition of claim 1, wherein the third (meth)acrylate monomer comprises at least one monomer selected from an aliphatic functional group-containing (meth)acrylate monomer, an alicyclic functional group-containing (meth)acrylate monomer, or a polar functional group-containing (meth)acrylate monomer.

7. The adhesive composition of claim 1, wherein the third (meth)acrylate monomer comprises an aliphatic functional group-containing (meth)acrylate monomer, an alicyclic functional group-containing (meth)acrylate monomer, and a polar functional group-containing (meth)acrylate monomer.

8. An adhesive film produced using the adhesive composition according to claim 1.

9. The adhesive film of claim 8, wherein the adhesive film is a semi-cured adhesive film produced by primary curing of the adhesive composition.

10. The adhesive film of claim 9, wherein the adhesive film is a fully cured adhesive film produced by additionally curing after the primary curing.

11. The adhesive film of claim 9, wherein a difference between a room temperature storage modulus and a high temperature storage modulus of the semi-cured adhesive film is 0.03 MPa or more.

12. The adhesive film of claim 9, wherein an adhesive strength of the semi-cured adhesive film to a glass base is 3.0 kgf/in or more.

13. The adhesive film of claim 10, wherein a difference between a room temperature storage modulus and a high temperature storage modulus of the fully cured adhesive film is 0.05 MPa or more.

14. The adhesive film of claim 10, wherein an adhesive strength of the fully cured adhesive film to a glass base is 3.0 kgf/in or more.

* * * * *